(12) United States Patent
Liang (10) Patent No.: US 7,619,786 B2
(45) Date of Patent: Nov. 17, 2009

(54) LINEAR ILLUMINATION APPARATUS AND METHOD

(75) Inventor: Rongguang Liang, Penfield, NY (US)

(73) Assignee: Carestream Health, Inc., Rochester, NY (US)

( * ) Notice: Subject to any disclaimer, the term of this patent is extended or adjusted under 35 U.S.C. 154(b) by 1029 days.

(21) Appl. No.: 11/089,484

(22) Filed: Mar. 24, 2005

(65) Prior Publication Data

US 2006/0215241 A1   Sep. 28, 2006

(51) Int. Cl.
    *H04N 1/04* (2006.01)
(52) U.S. Cl. ..................... 358/475; 358/484
(58) Field of Classification Search ............ 358/509, 358/510, 513, 514, 475, 480, 484; 399/4, 399/5; 313/372; 351/213
    See application file for complete search history.

(56) References Cited

U.S. PATENT DOCUMENTS

| 4,329,591 | A | * | 5/1982 | Fujiwara et al. ............. 250/548 |
| 4,375,647 | A | * | 3/1983 | Mir ............................. 358/505 |
| 4,598,738 | A | | 7/1986 | Weber et al. |
| 5,414,559 | A | | 5/1995 | Burghardt et al. |
| 5,721,416 | A | | 2/1998 | Burghardt et al. |
| 5,954,424 | A | | 9/1999 | Anderson et al. |
| 6,255,660 | B1 | | 7/2001 | Isoda et al. |
| 6,373,074 | B1 | | 4/2002 | Mueller et al. |
| 6,565,248 | B2 | | 5/2003 | Honguh et al. |
| 6,597,008 | B1 | | 7/2003 | Umemoto et al. |
| 6,744,033 | B2 | | 6/2004 | Ikeda |
| 7,132,343 | B2 | * | 11/2006 | Hongo et al. .............. 438/308 |
| 7,342,680 | B2 | * | 3/2008 | Nakamura ................. 358/1.6 |
| 7,480,082 | B2 | * | 1/2009 | Liang ........................ 358/474 |
| 2001/0017689 | A1 | * | 8/2001 | Iwaki ........................ 355/18 |
| 2001/0025936 | A1 | | 10/2001 | Shoji |
| 2001/0028047 | A1 | | 10/2001 | Isoda |
| 2002/0040972 | A1 | | 4/2002 | Arakawa |
| 2002/0056817 | A1 | | 5/2002 | Furue |
| 2002/0066865 | A1 | * | 6/2002 | Hung ...................... 250/458.1 |
| 2002/0096653 | A1 | | 7/2002 | Karasawa |
| 2002/0100887 | A1 | | 8/2002 | Hagiwara et al. |
| 2003/0010945 | A1 | | 1/2003 | Ishikawa |
| 2003/0128543 | A1 | | 7/2003 | Rekow |
| 2004/0113050 | A1 | * | 6/2004 | Olszak et al. ............ 250/208.1 |
| 2005/0088674 | A1 | * | 4/2005 | Nakamura ................. 358/1.9 |

FOREIGN PATENT DOCUMENTS

| EP | 1 089 069 A2 | 4/2001 |
| EP | 1 168 001 A2 | 1/2002 |
| JP | 06086011 | 3/1994 |

* cited by examiner

*Primary Examiner*—Jerome Grant, II (57) ABSTRACT

An illumination apparatus including a plurality of light sources in a linear array. An elongated aperture blocks unwanted light and directs light from the light sources in the linear array into an optical integrator for integrating the light to form a uniformized linear illumination of substantially uniform irradiance. At least one lens is provided for imaging the uniformized linear illumination to form a linear illumination beam.

13 Claims, 12 Drawing Sheets

LINEAR ILLUMINATION APPARATUS AND METHOD

CROSS REFERENCE TO RELATED APPLICATIONS

Reference is made to commonly assigned application U.S. Ser. No. 11/089,497, entitled "LINEAR ILLUMINATION USING CYLINDRICAL ELLIPTICAL REFLECTIVE SURFACE", and filed on common date in the name of Liang, and which is assigned to the assignee of this application.

FIELD OF THE INVENTION

The present invention generally relates to imaging systems for reading images exposed on computed radiography (CR) plates. More particularly, the present invention relates to an illumination apparatus for scanning line images from a stimulable phosphor surface.

BACKGROUND OF THE INVENTION

Computed Radiography (CR) systems using stimulable phosphor sheets are well known clinical imaging tools. In a CR system, radiation is passed through a subject and impinges upon a stimulable phosphor sheet, commonly referred to as a CR plate, phosphor plate, or CR sheet, that stores a portion of the radiation energy as a latent image. After exposure to the radiation, the stimulable phosphor on the CR plate is subsequently scanned using an excitation light, such as a visible light or laser beam, in order to emit the stored image.

Some CR scanning systems employ a flying-spot scanning mechanism, in which a single laser beam is scanned across the CR plate in a raster pattern. The resulting excitation that provides the stored image is then directed to a sensor, providing a single point of image data at a time. Other CR systems provide a full line of image data at a time, offering advantages of faster throughput and lower cost and complexity over flying-spot scanners. For example, U.S. Pat. No. 6,373,074 (Mueller et al.) entitled "Device for Reading Out Information Stored in a Phosphor-Carrier, and an X-Ray Cassette" is directed to a CR system that scans a full line of image data points at a time.

Figure 1:
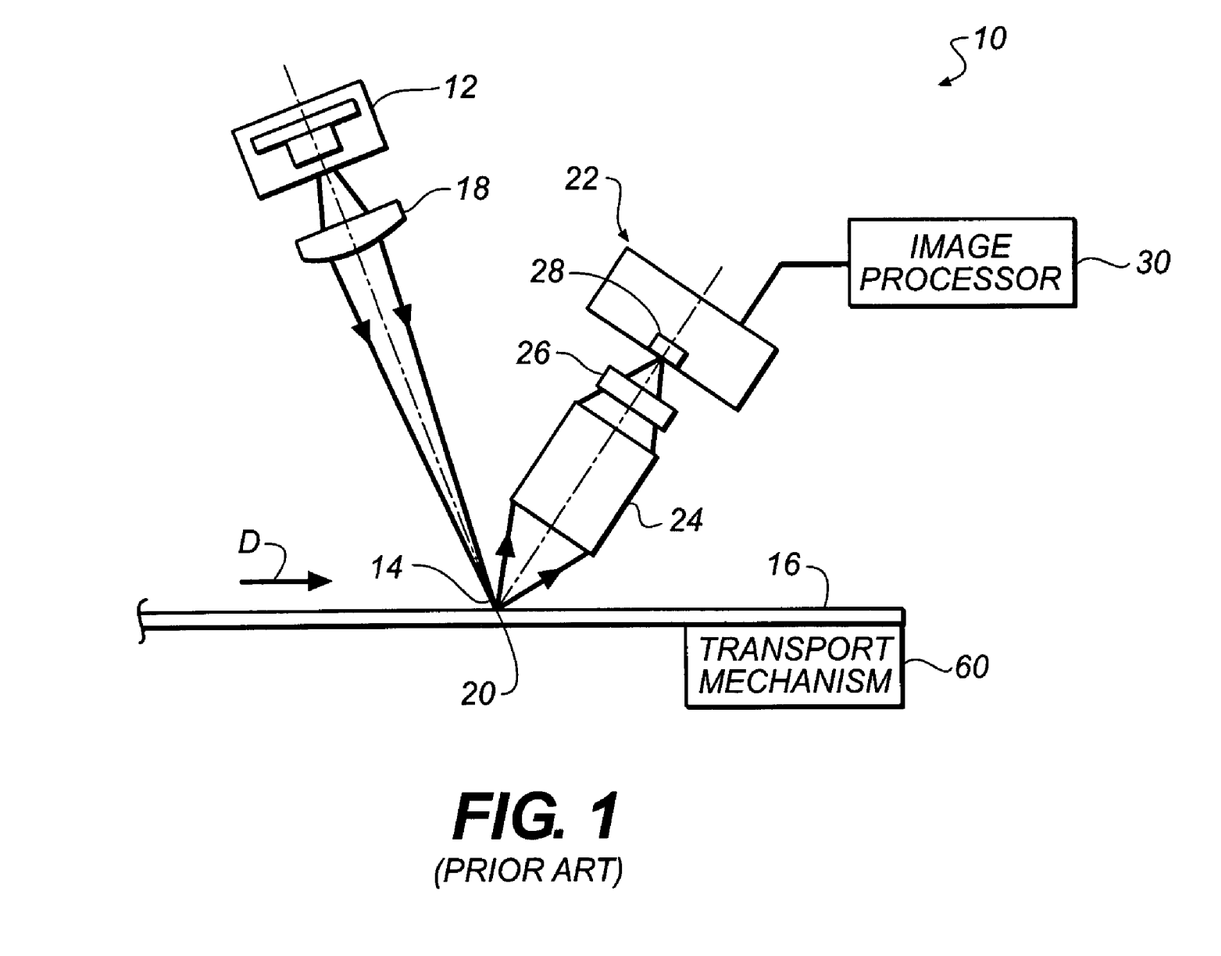
FIG. 1 is a diagrammatic illustration showing the basic component arrangement of a conventional CR plate reader.

FIG. 1 shows the basic components of a prior art CR optical scanning system 10. A linear light source 12, typically using an array of laser diodes or other light sources, directs a linear scanning beam 14 onto a stimulable phosphor sheet 16 that has been irradiated and stores a latent X-ray image. One or more cylindrical lenses 18 are used to direct the highly asymmetric linear output beam along a line 20 on the surface of phosphor sheet 16. In a sensing head 22, collection optics 24 then direct the stimulated light from line 20 on phosphor sheet 16 through an optical filter 26 and to a linear photodetector array 28, typically a CCD (charge-coupled device) array. Phosphor sheet 16 is indexed in direction D by a transport mechanism 60 to provide a scanning motion. In this way, phosphor sheet 16 is moved past sensing head 22 to detect each line of the image stored thereon. The sensed image data is then processed by an image processor 30 that assembles a two-dimensional output image from each successive sensed line. The output image can then be stored or displayed.

There have been a number of features proposed for improving the performance of CR plate scanner optics. Several examples are noted below.

U.S. Patent Application Publication No. 2003/0010945 entitled "Radiation Image Read-Out Apparatus" (Ishikawa) is directed to a light projection apparatus for projecting a line of stimulating light from an array of laser diodes.

U.S. Patent Application Publication No. 2002/0096653 entitled "Radiation Image Information Read-Out Apparatus" (Karasawa) relates to the use of condenser lens chromatic characteristics for isolating stimulated light from stimulating light provided from the array of laser diodes.

U.S. Patent Application Publication No. 2002/0056817 entitled "Radiation Image Information Reading Recording Apparatus" (Furue) is directed to a reading apparatus for obtaining the stored image from an irradiated stimulable phosphor sheet using an array of laser diodes.

U.S. Patent Application Publication No. 2002/0040972 entitled "Radiation Image Read-Out Method and Apparatus" (Arakawa) relates to an optical reading head using an array of laser diodes that employs a grid pattern for sensing each line of the stored image.

U.S. Patent Application Publication No. 2002/0100887 entitled "Radiation-Image Data Readout Apparatus and Line Sensor to be Utilized Therein" (Hagiwara et al.) relates to an improved sensing arrangement in a scanning head for a stimulable phosphor sheet.

U.S. Patent Application Publication No. 2001/0025936 entitled "Image Detecting Device and Readout Exposure Apparatus Therefore" (Shoji) is directed to an illumination apparatus using pairs of cylindrical lenses and a slit for conditioning light from an LED array or other linear array of light sources.

U.S. Patent Application Publication No. 2001/0028047 entitled "Radiation Image Read-Out Apparatus" (Isoda) relates to a system using conventional optical techniques with improvements to line sensor components for obtaining a larger percentage of the stimulated light.

U.S. Pat. No. 5,721,416 entitled "Optics for Forming a Sharp Illuminating Line of a Laser Beam" (Burghardt et al.) is directed to the use of a homogenizing optical system for conditioning a laser beam, such as a system that utilizes an arrangement of specially configured lens elements for spreading the incident laser beam over a broadened area, such as described in U.S. Pat. No. 5,414,559 (Burghardt et al.).

U.S. Patent Application Publication No. 2003/0128543 entitled "Apparatus for Projecting a Line of Light from a Diode-Laser Array" (Rekow) discloses an apparatus for forming a line of light from a diode laser bar, using an arrangement of anamorphic lenses, including cylindrical microlens arrays.

U.S. Pat. No. 6,565,248 entitled "Light Guide, Line Illumination Apparatus, and Image Acquisition System" (Honguh et al.) discloses a system using LED light sources and scattering marks arranged within a light guide, where the scattering marks are positioned near the focal point formed by an elliptical surface portion of the light guide, so that light is directed toward a surface to be scanned at a preferred angle.

U.S. Pat. No. 6,744,033 entitled "Bar-Shaped Light Guide, Line-Illuminating Device Incorporated with the Bar-Shaped Light Guide and Contact-Type Image Sensor Incorporated with the Line-Illuminating Device" (Ikeda) discloses an elliptically shaped illuminating light guide using scatterers for redirecting LED illumination, similar to that of the '248 Honguh et al. patent.

U.S. Pat. No. 4,598,738 entitled "Apparatus for Projecting a Laser Beam in a Linear Pattern" (Ozaki) relates to the use of a concave mirror for redirecting laser illumination that has been reflected from a convex reflector disposed in front of the mirror, forming a line of illumination thereby.

While there have been improvements to apparatus and methods for obtaining the stored image on a CR plate, there is still need for increased efficiency and overall image quality. One area of particular interest relates to providing a linear illumination source that is less expensive and more robust than that provided by conventional approaches.

Referring back to FIG. 1, light source 12 directs a narrow line of light onto stimulable phosphor sheet 16 as scanning beam 14. For obtaining high levels of image quality, scanning beam 14 must be of sufficient intensity and must be uniform over the length of the scan line. When using an array of multiple light sources, such as LEDs or laser diodes, illumination performance is compromised by premature aging or failure of one or more individual elements in the array.

Figure 2A:
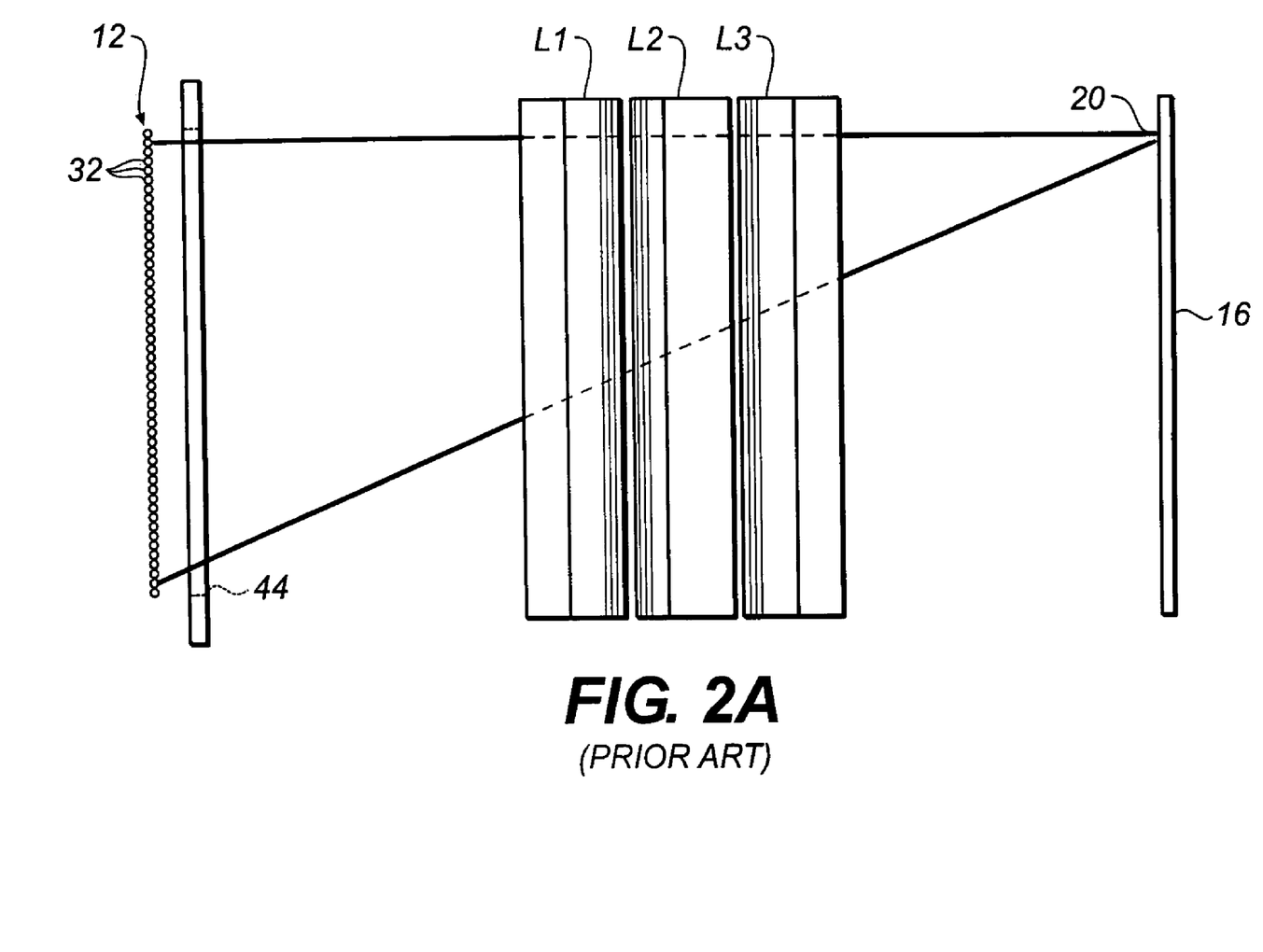
FIG. 2A is top view diagrammatic illustration showing the arrangement of a conventional linear illumination apparatus.
Figure 2B:
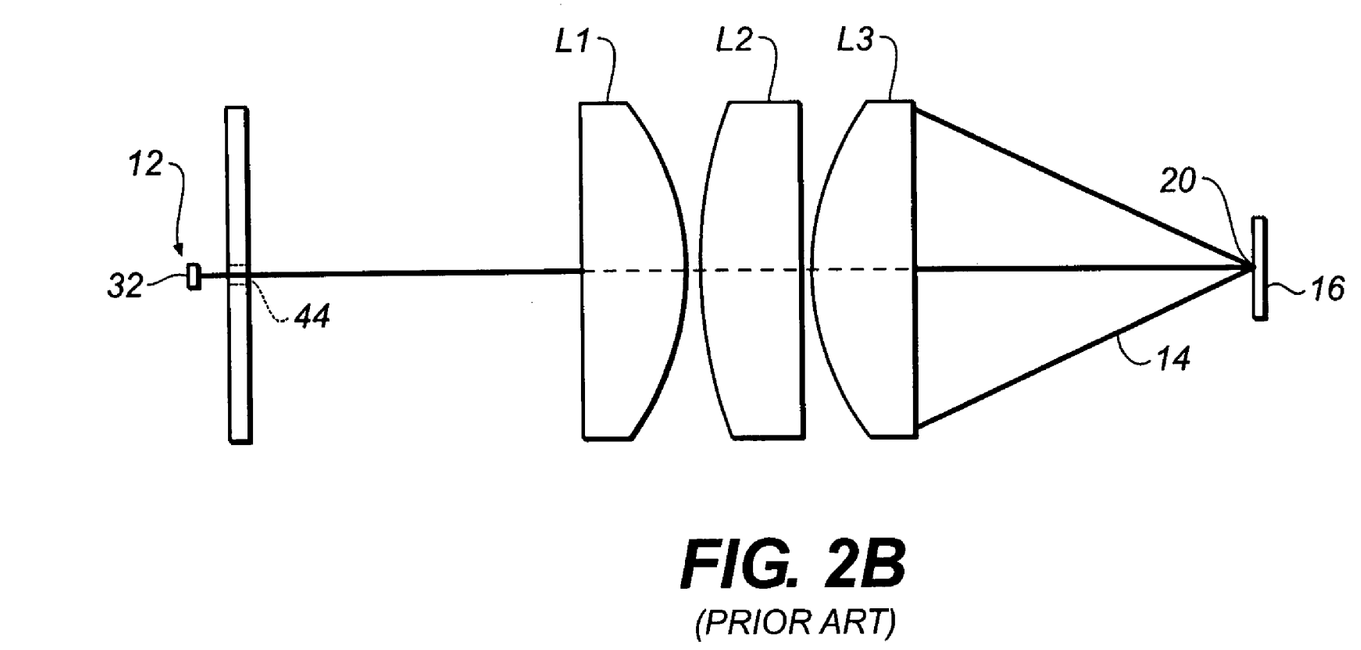
FIG. 2B is a side view diagrammatic illustration showing the arrangement of the conventional linear illumination apparatus of FIG. 2A.

Referring to FIG. 2A (a top view) and FIG. 2B (a side view), there is shown the arrangement of a prior art conventional light source and light conditioning components for providing an illuminating line of stimulating radiation suitable as a scan line for CR plate sensing applications. Light source 12 has an array of LEDs 32, or other suitable light-emitting sources, that direct light through an aperture 44 and to a set of cylindrical lenses L1, L2, and L3. Lenses L1, L2 and L3 form line 20 of illumination for CR plate stimulation. This basic arrangement, with variation in the number of LEDs 32 and in the number and arrangement of cylindrical lens elements, provides a line of light that is sufficiently uniform, thin, and sharp for CR plate scanning, using an economical LED array. The length of line 20 is scalable and can be increased by adding more individual LEDs 32 to the array.

Figure 3A:
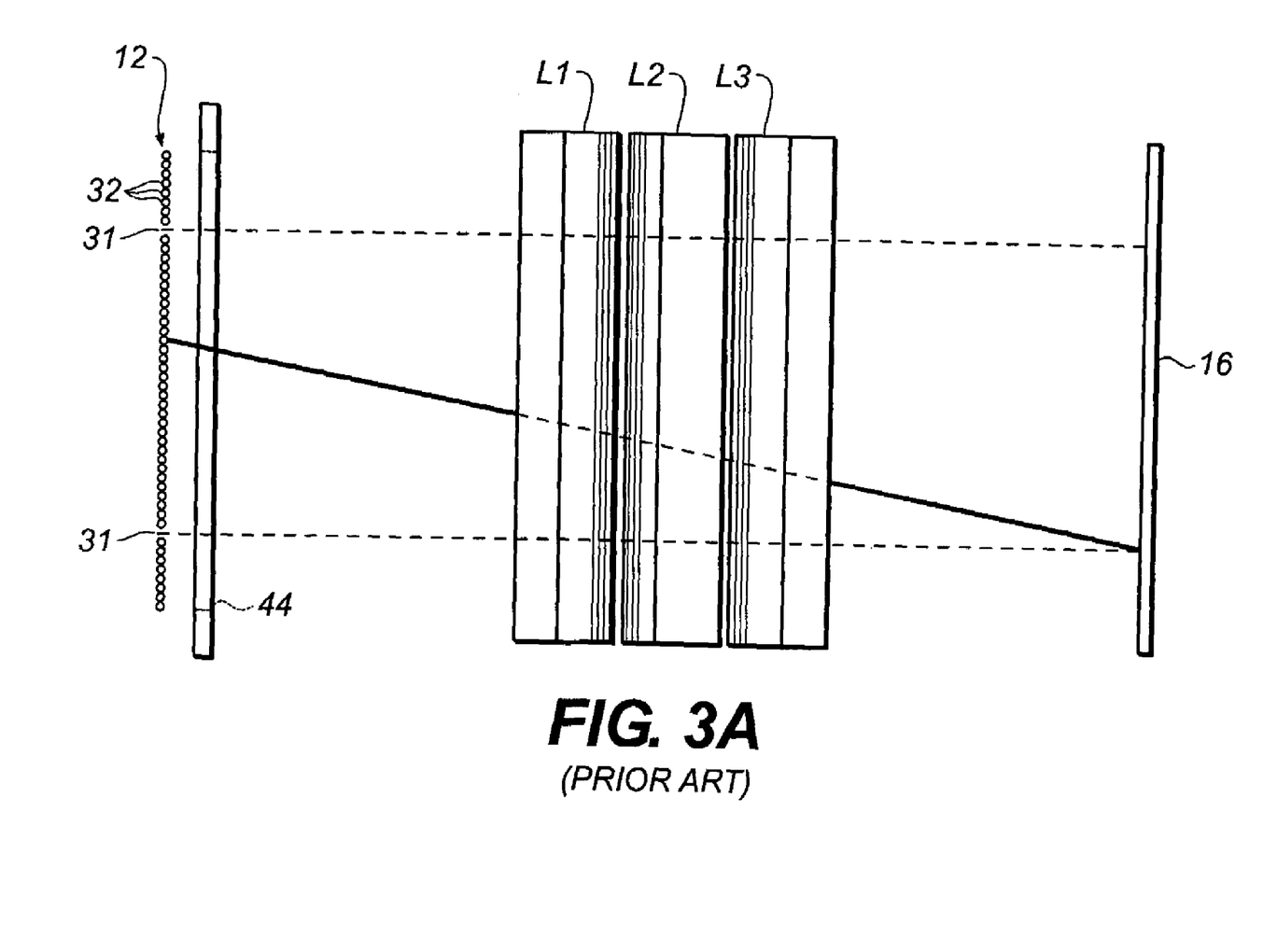
FIG. 3A is top view diagrammatic illustration showing the arrangement of a conventional linear illumination apparatus, having a defective light source.
Figure 3B:
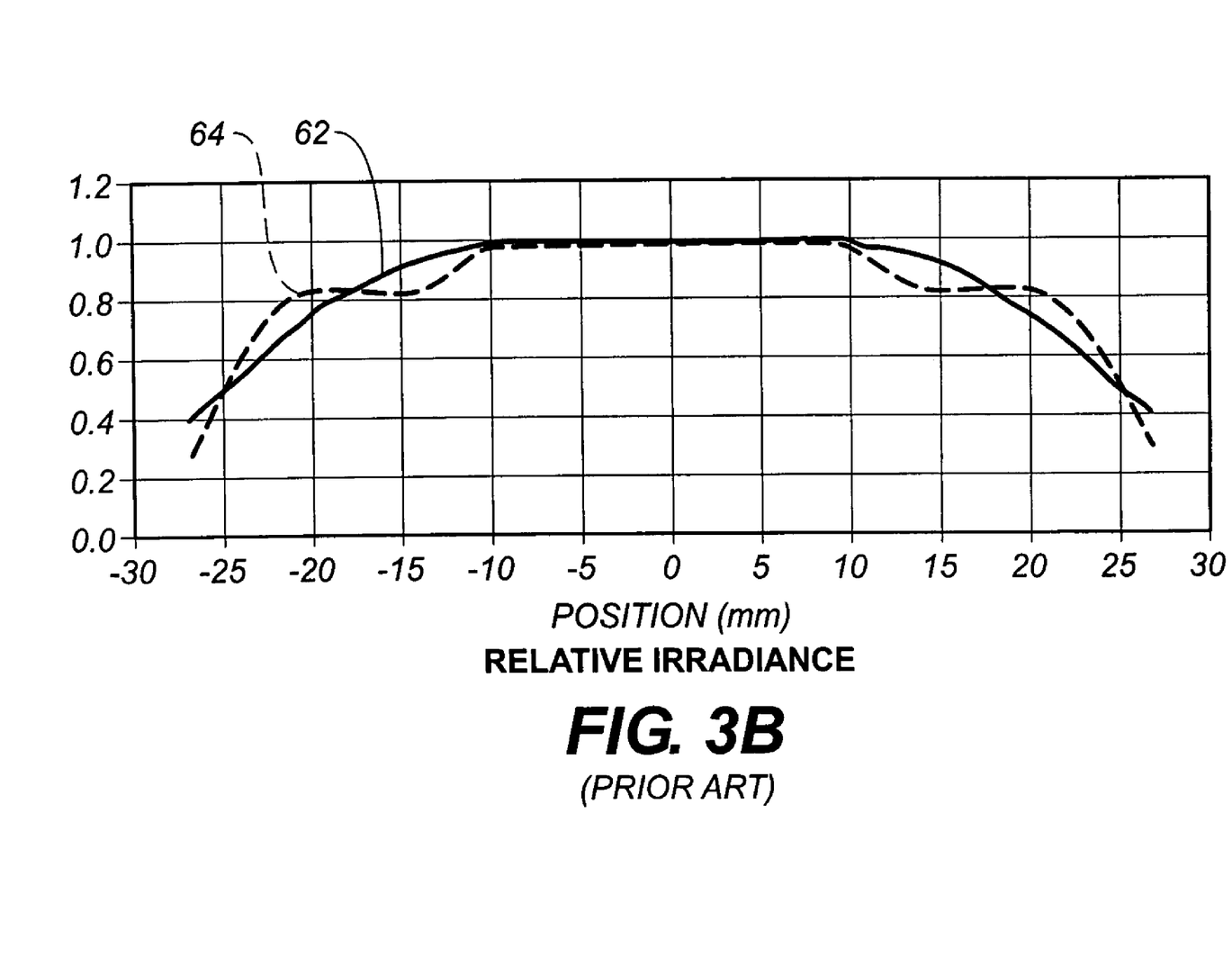
FIG. 3B is a graph showing relative irradiance along a line of illumination formed using conventional linear illumination apparatus.

There are drawbacks to the arrangement shown in FIGS. 2A and 2B. Failure of one or more individual LEDs 32 can result in a loss of uniformity. Referring to FIG. 3A, there are shown two faulted LEDs 31 in a portion of the LED array of light source 12. The graph of FIG. 3B shows relative irradiance over the corresponding portion of the length of line 20. As a best-case baseline, curve 62 shows relative irradiance when all LEDs 32 emit light. For comparison, the dotted line of curve 64 shows relative irradiance with two faulted LEDs 31. The resulting nonuniformity of illuminating line 20 may result in corresponding non-uniformities in the diagnostic X-ray image obtained from phosphor sheet 16 (FIG. 1).

Methods such as the use of a slit, as shown in the '25936 Shoji application cited above, can help to distribute light more uniformly and compensate somewhat for individual light source failures. However, even with conventional methods for faulted LED 31 compensation, image quality suffers as a result of component failure.

For suitable contrast, scanning beam 14 must have sufficiently narrow width and sharp definition, so that only the line of the stored image currently being sensed is stimulated. A number of patents address the problem of correcting diffusion of scanning beam 14. For example, U.S. Pat. No. 6,597,008 entitled "Method of Reading a Radiation Image Converting Panel" to Umemoto et al. and U.S. Pat. No. 6,255,660 entitled "Stimulable Phosphor Sheet Having Divided Phosphor Layer" to Isoda et al. both note that diffusion of the excitation light is undesirable and disclose phosphor sheet design solutions to counteract this unwanted effect.

Thus, there are challenges to obtaining an illumination apparatus for CR plate scanning and other scanning applications that provides suitable linear illumination having sufficiently narrow width and having uniform irradiance along its length, using an array of LEDs or other Lambertian light emitters. In particular, there is a need for an illumination apparatus that is robust to failure of individual LEDs 32 or other light sources.

The present invention is directed to providing a linear illumination apparatus and method intended to overcome at least one disadvantage noted above.

SUMMARY OF THE INVENTION

According to one aspect of the present invention, there is provided an illumination apparatus comprising: a) a plurality of light sources in a linear array; b) an elongated aperture disposed for blocking unwanted light and directing light from the light sources in the linear array into an optical integrator for integrating the light to form a uniformized linear illumination of substantially uniform irradiance; and c) at least one lens for imaging the uniformized linear illumination to form a linear illumination beam.

According to another aspect of the present invention, there is provided a method for providing linear illumination, the method comprises the steps of: providing a plurality of light sources in a linear array; providing an elongated aperture for blocking unwanted light and directing light from the plurality of light sources in the linear array into an optical integrator; integrating the directed light to cause uniformity of irradiance and provide a uniformized linear illumination, and imaging the uniformized linear illumination to form a linear illumination beam.

According to yet another aspect of the present invention, there is provided a reading apparatus for obtaining a line of image data stored on a surface. The reading apparatus comprises a radiation source for directing a line of stimulating radiation onto a stimulable image carrier on the surface to generate a line of image-bearing radiation. The radiation source includes: (i) a plurality of light sources in a linear array; (ii) an aperture disposed for blocking unwanted light and directing light from the light sources in the linear array into an optical integrator for integrating the light to form a uniformized linear illumination of substantially uniform irradiance; and (iii) at least one lens for imaging the uniformized linear illumination to form a linear illumination beam. The reading apparatus further comprises: a sensing head for obtaining image data from the line of image-bearing radiation excited from the image carrier, the sensing head comprising a plurality of channels, each channel adapted to sense a segment of the line of image-bearing radiation; and an image processor for accepting the image data obtained from sensing head channels and forming a line of image data according to the line of image-bearing radiation.

The present invention employs an integrator element for uniformizing light provided by a linear array.

The present invention provides a linear light having improved uniformity, particularly suited to scanning applications.

An advantage of the present invention is that it reduces the dependence of an illumination source on any individual light source in an array for providing uniform intensity.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

The following is a detailed description of the preferred embodiments of the invention, reference being made to the drawings in which the same reference numerals identify the same elements of structure in each of the several figures.

Figure 4A:
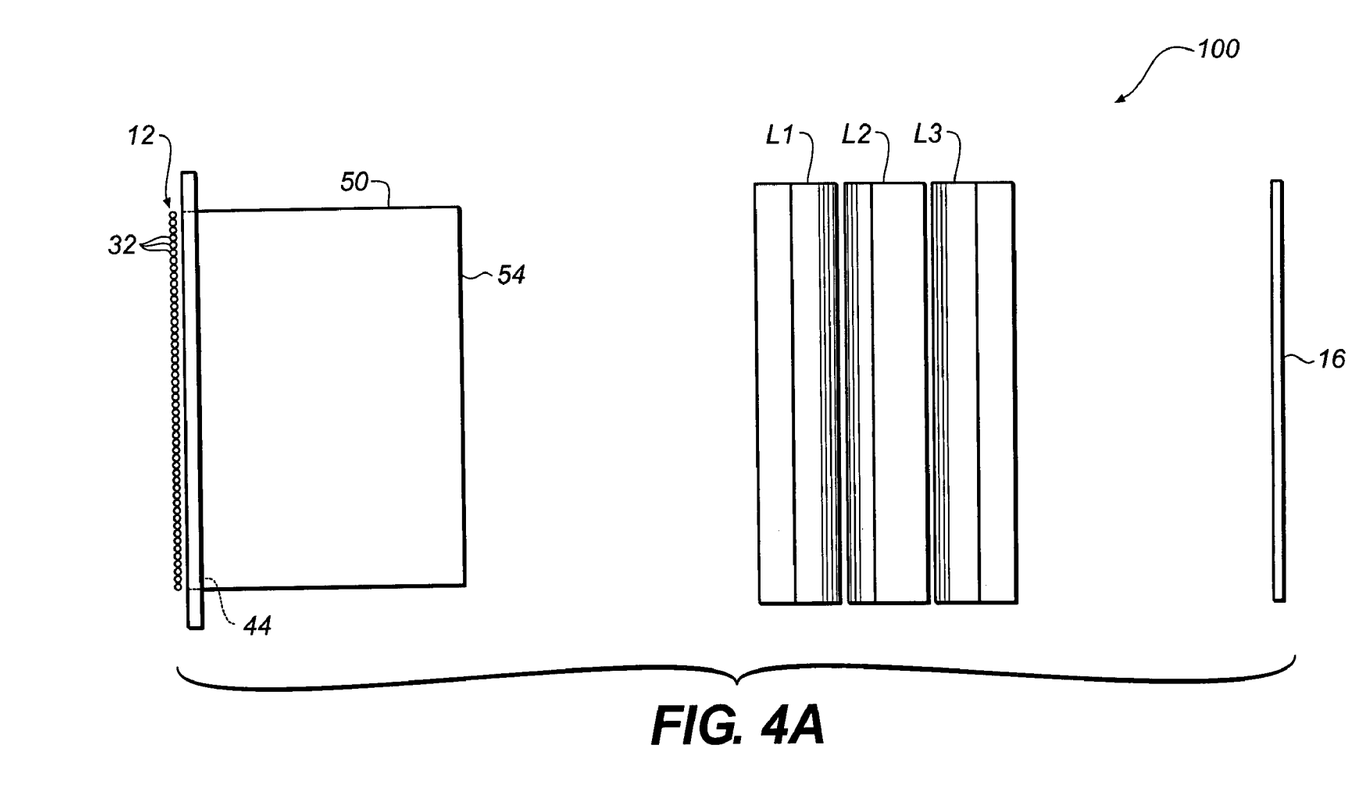
FIG. 4A is a top view diagrammatic illustration showing an illumination apparatus according to the present invention.

Referring to FIG. 4A, there is shown a top view of an illumination apparatus 100 according to the present invention. Light source 12 has a linear array of LEDs 32, or other light sources, that direct light through elongated aperture 44 and into a light pipe 50 or other suitable type of optical integrator. Light pipe 50 conditions the incident light from the array of LEDs 32 to provide a uniformized linear illumination of essentially uniform irradiance at its output 54. Cylindrical lenses L1, L2, and L3, in the embodiment of FIG. 4A, then image this linear output beam to provide a linear illumination beam onto phosphor sheet 16 or other surface to be scanned in linear fashion.

Figure 4B:
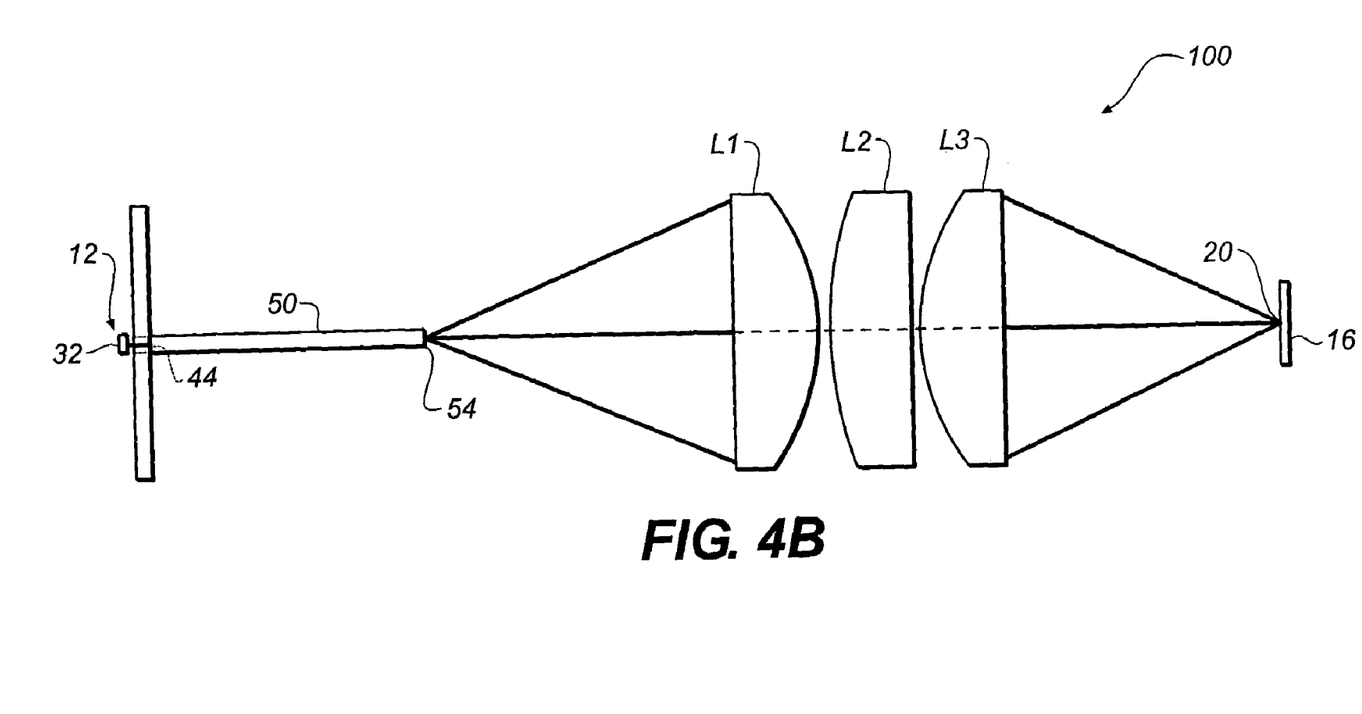
FIG. 4B is a side view diagrammatic illustration showing the illumination apparatus of FIG. 4A.

FIG. 4B shows a side view of illumination apparatus 100. In a preferred embodiment, light pipe 50, which is also elongated along the line of light provided by the array of LEDs 32, homogenizes or uniformizes the light using Total Internal Reflection (TIR). Light pipes of this type are familiar to those skilled in the optical arts and can be obtained from manufacturers such as JDS Uniphase Corporation, Santa Rosa, Calif., for example. The shape, length, and thickness dimensions of light pipe 50 can be varied to provide the desired uniformization of the linear illumination. Aperture 44 blocks unwanted light that is incident at angles outside of the range of angles that is suitable for uniformizing by TIR.

Figure 5A:
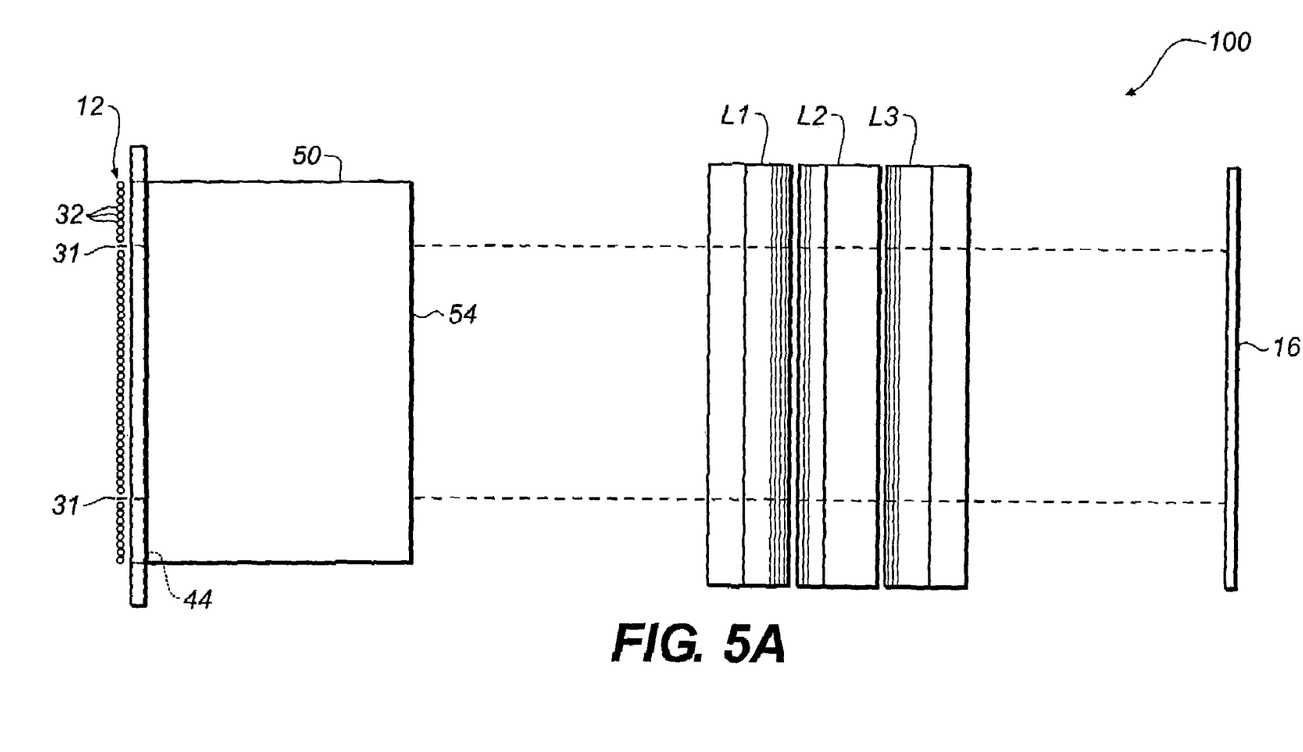
FIG. 5A is a top view diagrammatic illustration showing an illumination apparatus according to the present invention, having a defective light source.

Light pipe 50 provides an overall uniformizing effect on the illumination that compensates for failure of one or more light sources in the linear array. Referring to FIG. 5A, there is shown a portion of the array of light source 12 having two faulted LEDs 31. As was described in the background section with respect to FIGS. 3A and 3B, these faults have a noticeable impact on the irradiance uniformity of the linear illumination beam with conventional illumination systems.

Figure 5B:
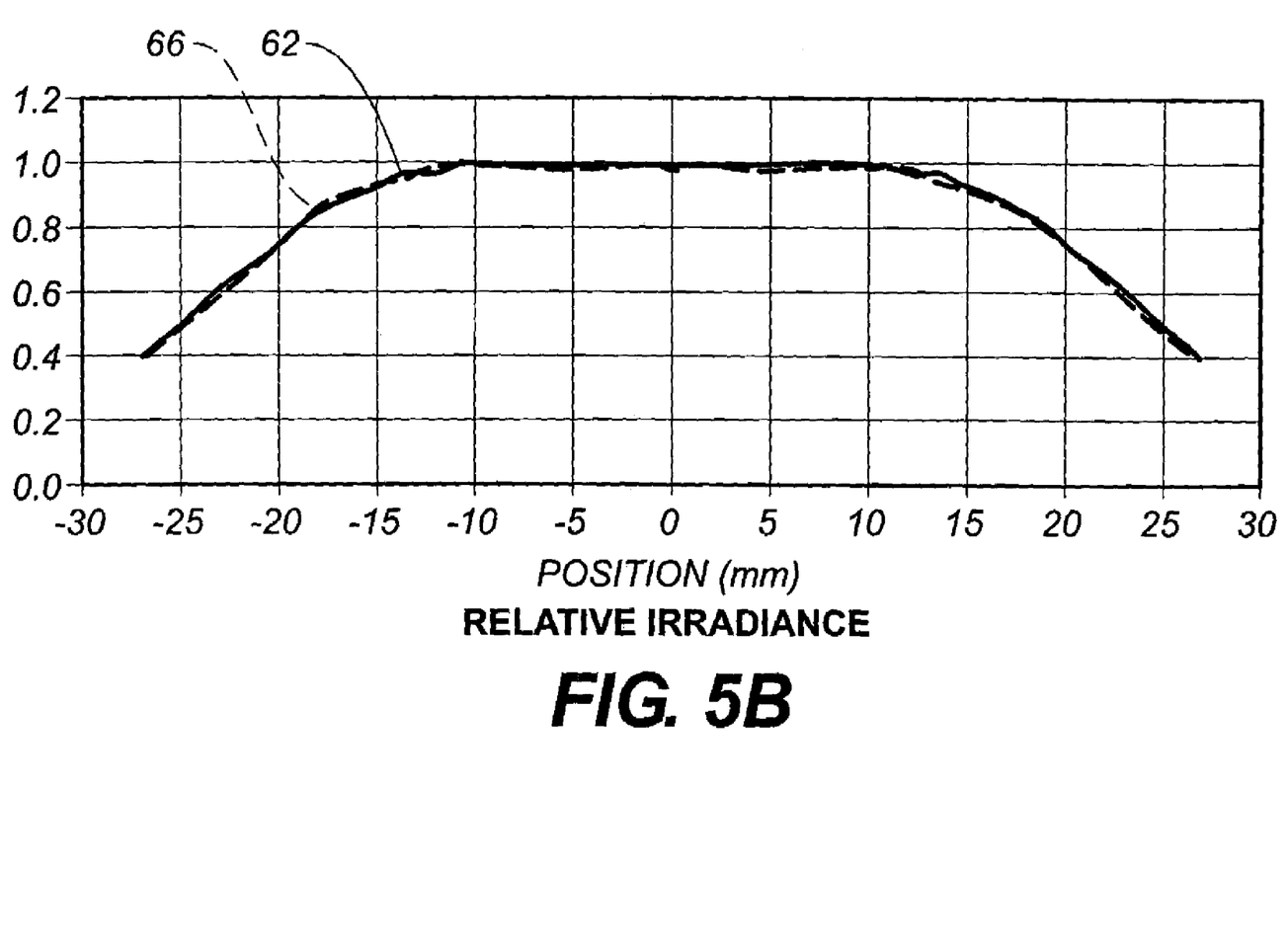
FIG. 5B is a graph showing relative irradiance along a line of illumination formed using a linear illumination apparatus according to the present invention.

As is shown in the graph of FIG. 5B, however, the embodiment of the present invention shown in FIGS. 4A, 4B, and 5A is advantaged over the conventional arrangement of FIGS. 2A, 2B, and 3A. In FIG. 5B, continuous line curve 62 shows relative irradiance for light source 12 in FIG. 4A when all LEDs 32 emit light. A dotted line curve 66 shows relative irradiance with faulted LEDs 31 as shown in FIG. 5A. As FIG. 5B illustrates, the failure of a small number of LEDs 32 would have minimal overall effect on the relative irradiance provided by illumination apparatus 100. This is unlike the resultant irradiance profile for faulted LEDs 31 with conventional illumination solutions, as was shown in FIG. 3B.

Figure 6A:
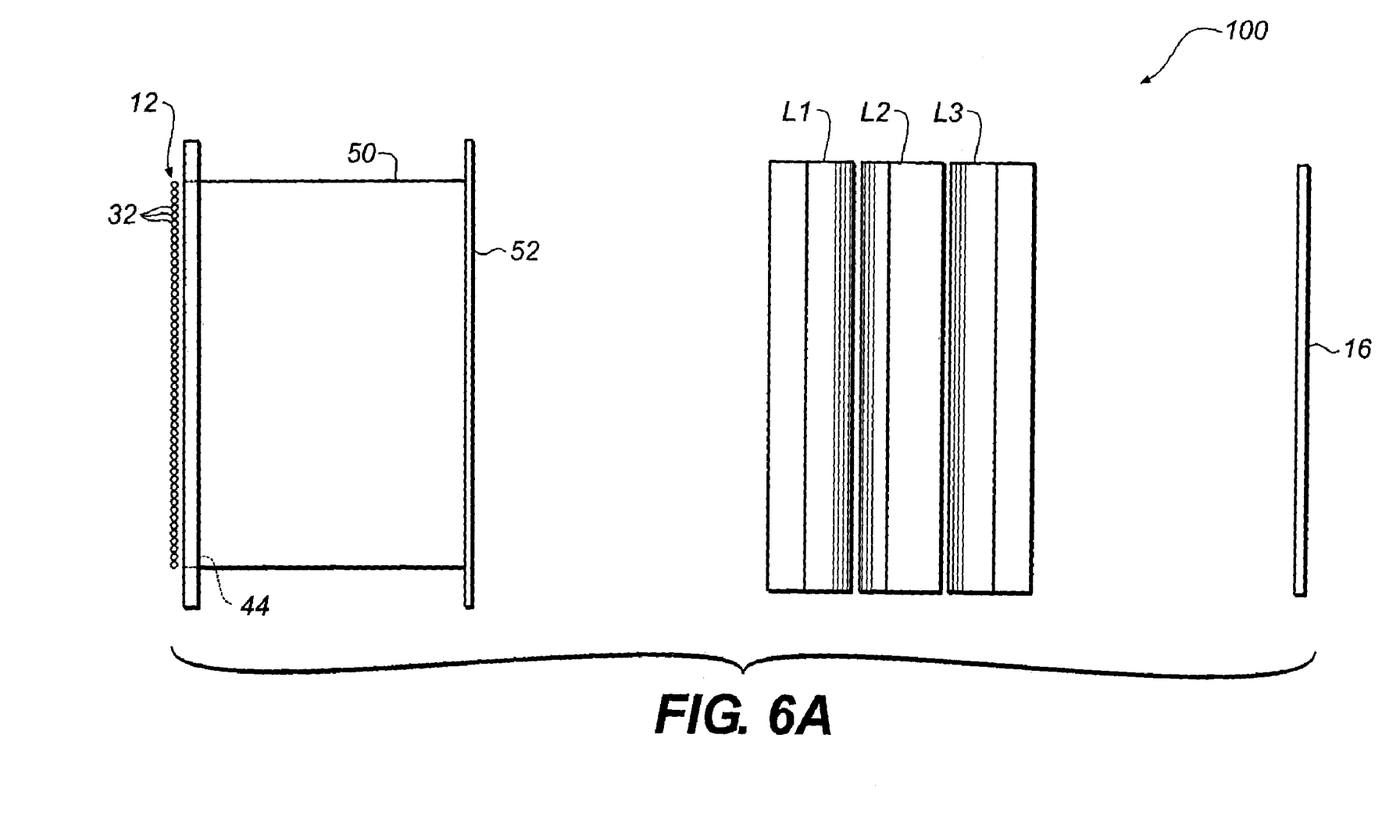
FIG. 6A is a top view diagrammatic illustration showing an illumination apparatus according to an alternate embodiment of the present invention.

Referring now to FIG. 6A, there is shown an embodiment of illumination apparatus 100 employing a filter 52 to condition irradiance characteristics across the length of the illuminating line 20. Filter 52 can be, for example, a variable transmission filter fabricated by applying a variable density coating to a glass or other transparent substrate. Filter 52 can alternately be fabricated using other methods, for example, microlithographic techniques. For scanning applications in which a surface is scanned in a series of partially overlapping swaths, filter 52 has its highest transmittance (T) over a central portion of the scanned line length, with transmittance gradually diminished with increased distance from this central portion. Filter 52, placed proximate output 54 of light pipe 50, conditions the uniformized linear illumination emitted from output 54.

Figure 7:
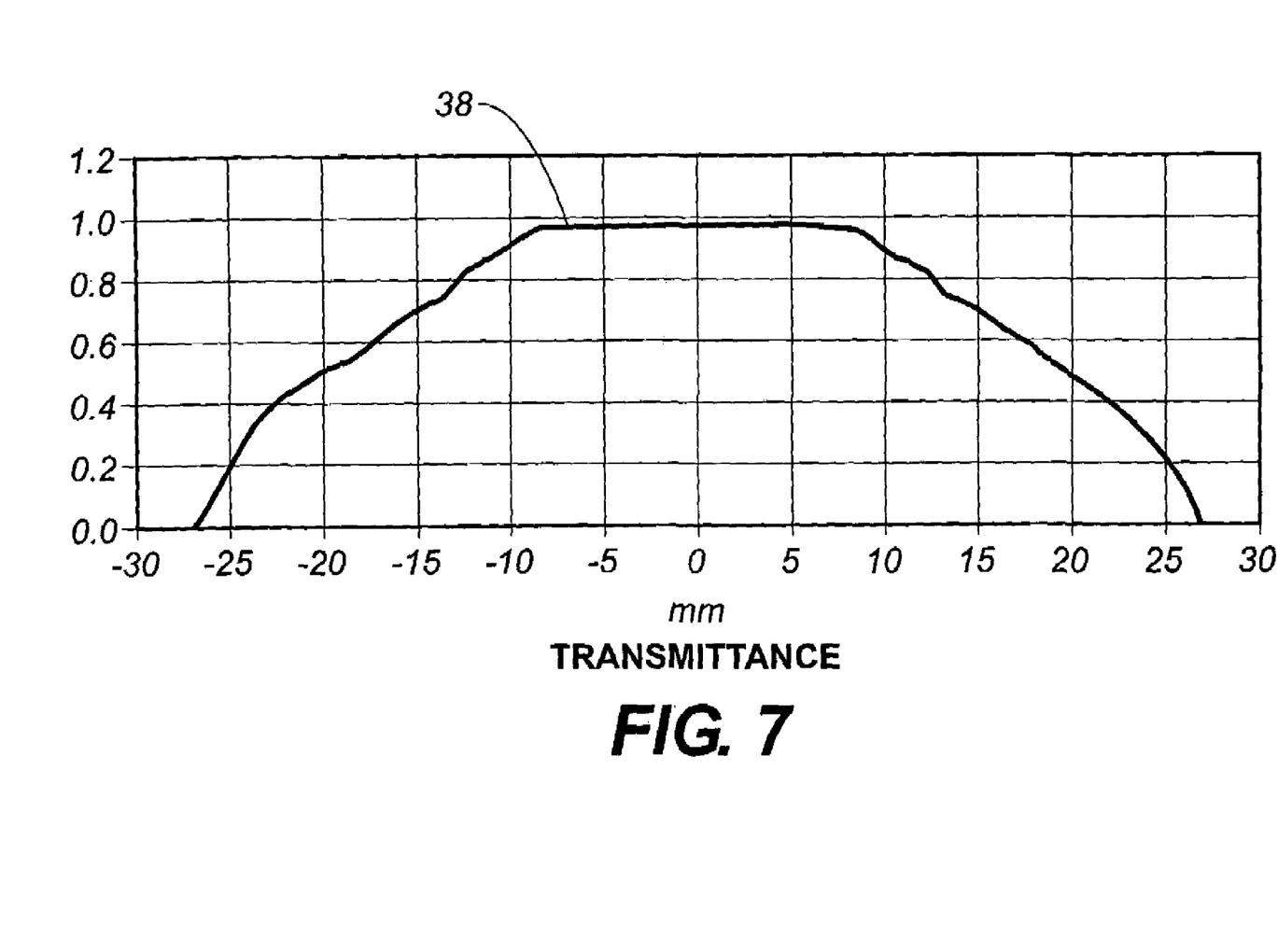
FIG. 7 is a graph showing the transmission profile of a filter in accordance with one embodiment.

FIG. 7 shows a transmission profile 38 for filter 52 according to one embodiment. In the figure, the transmittance of a central portion of filter 52, from about −10 to about +10 mm relative to the center of filter 52, is high, very near a maximum T value of 1.0. On each side of the central portion, approximately bounded at −10 and +10 mm from center, transmittance decreases rapidly with increased distance from this central portion. As is apparent to one skilled in the optical design arts, the overall shape of transmission profile 38, determining characteristics such as the level and breadth of a high transmittance portion and the relative rate of decrease over distance, can be controlled in fabrication of filter 52.

As such, conditioning the uniformized linear illumination output from light pipe 50 using filter 52 enables some measure of control over the output cross-sectional irradiance profile of line 20.

Figure 6B:
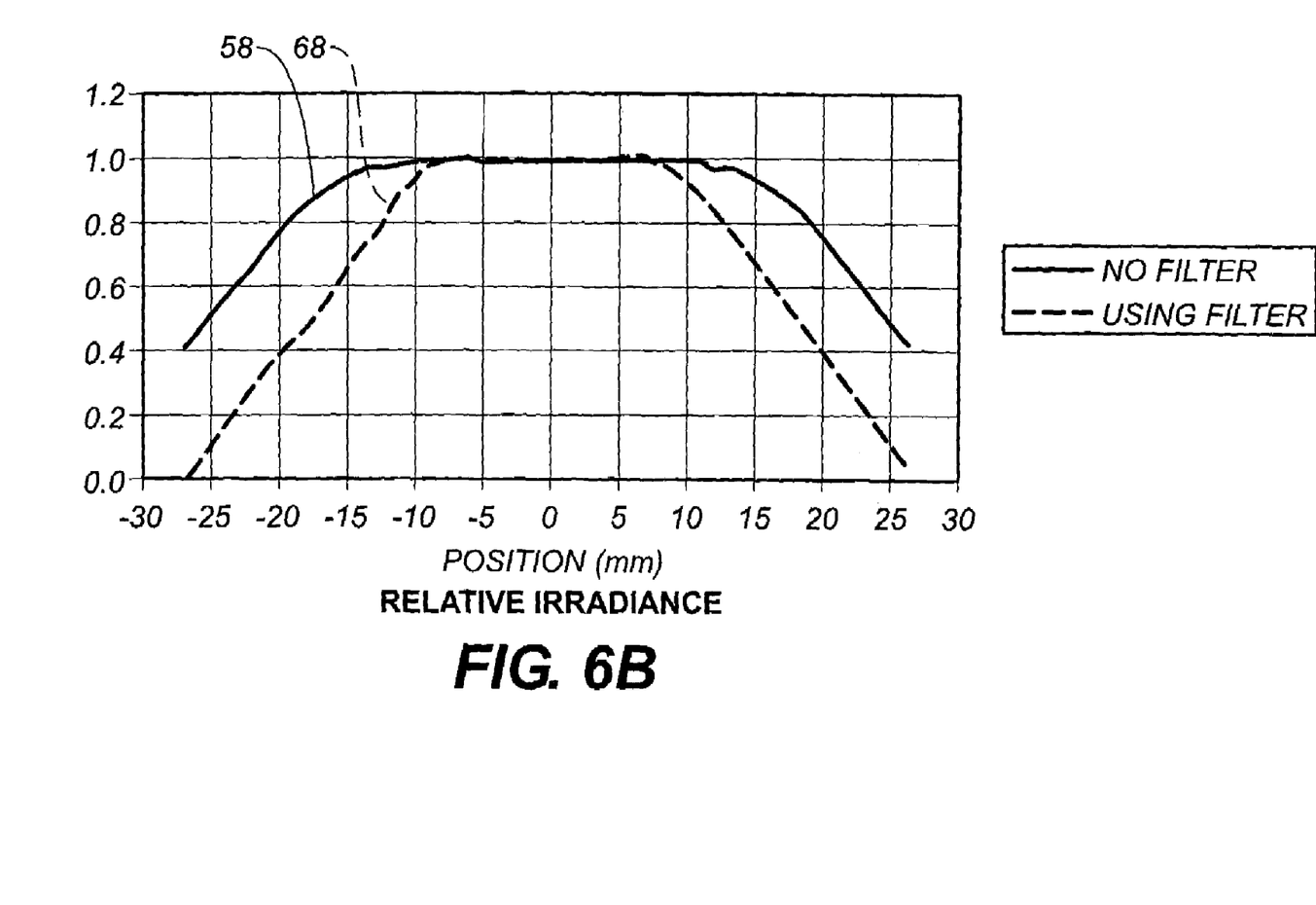
FIG. 6B is a graph showing the cross-sectional irradiance contour of the line of illumination formed using the apparatus of the present invention, under different conditions.

The graph shown in FIG. 6B shows a cross-sectional irradiance profile of line 20 with and without filter 52. A continuous line curve 58 shows irradiance without filter 52. A dotted line curve 68 shows irradiance when using filter 52. Again, it must be emphasized that the curves of FIGS. 6B and 7 are exemplary only; alternative arrangements are possible for modulating irradiance along line 20.

The present invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

For example, while LEDs 32 are shown in the embodiments of FIGS. 4A, 4B, 5A, and 6A, other types of light sources can be used. The apparatus and method of the present invention are particularly suited for the use of Lambertian light sources that emit light over a broad range of angles. As optical integrator, various types of light pipes 50 could be used, such as solid rod or hollow light pipes, for example. Other types of uniformizer or homogenizer could be deployed as optical integrator in place of light pipe 50, such as an integrator bar or an array using multiple refractive structures such as a lenslet array; however, light pipe design is particularly advantaged for overall efficiency and performance.

One or more cylindrical lenses L1, L2, L3 can be used for directing light to form line 20. In at least one embodiment described herein, lenses L1, L2, and L3 are shown and described as cylindrical lenses. Toroidal or other non-cylindrical anamorphic shapes could alternately be used.

The apparatus and method of the present invention have been described with reference to an illumination apparatus for use in CR plate scanning. With reference to optical scanning system 10 in FIG. 1, illumination apparatus 100 of the present invention could be used (in place of conventional light source 12 and lens 18 shown) to provide scanning beam 14 and thereby to illuminate line 20 on phosphor sheet 16. The linear illumination apparatus described and claimed herein could also be used for illumination in other applications in which a line of light is useful, such as with various other types of scanning systems, for example. The apparatus and method of the present invention are particularly advantaged for applications requiring a line of light, where it is desirable to modulate the relative irradiance of light along the line.

Thus, the present invention provides an apparatus and method for providing a line of illumination having a substantially uniform intensity.

All documents, patents, journal articles and other materials cited in the present application are hereby incorporated by reference.

The invention has been described in detail with particular reference to certain preferred embodiments thereof, but it will be understood that variations and modifications can be effected within the spirit and scope of the invention.

PARTS LIST

10. Optical scanning system
12. Light source
14. Scanning beam
16. Phosphor sheet
18. Lens
20. Line
22. Sensing head
24. Collection optics
26. Optical filter
28. Photodetector array
30. Image processor
31. Faulted LED
32. LED
38. Transmission profile
44. Aperture
50. Light pipe
52. Filter
54. Output
60. Transport mechanism
62,64. Curve
58, 66, 68. Curve
100. Illumination apparatus
D. Direction
L1, L2, L3 Lens element

The invention claimed is:

1. An illumination apparatus, comprising:
   a plurality of light sources in a linear array;
   an optical integrator integrating light from the plurality of light sources directly into a uniformized linear illumination of substantially uniform irradiance;
   an elongated aperture, positioned intermediate the plurality of light sources and optical integrator, for blocking unwanted light and directing light from the plurality of light sources in the linear array into the optical integrator; and
   at least one lens, positioned subsequent to the elongated aperture, for imaging the uniformized linear illumination onto a surface.

2. The illumination apparatus of claim 1 wherein the plurality of light sources are LEDs.

3. The illumination apparatus of claim 1 wherein the optical integrator is an integrator bar.

4. The illumination apparatus of claim 1 wherein the optical integrator comprises an array of refractive elements.

5. The illumination apparatus of claim 1 wherein the at least one lens is a cylindrical lens.

6. The illumination apparatus of claim 1 wherein the at least one lens is a toroidal lens.

7. The illumination apparatus of claim 1 wherein the optical integrator comprises a light pipe.

8. The illumination apparatus of claim 1 further comprising a filter to condition the uniformized linear illumination output from the optical integrator.

9. The illumination apparatus of claim 8 wherein the filter comprises a central portion, wherein the central portion provides highest transmittance values for the filter and wherein the filter exhibits decreased transmittance with distance from the central portion.

10. A reading apparatus for obtaining a line of image data stored on a surface, the reading apparatus comprising:
    a radiation source for directing a line of stimulating radiation onto a surface of a stimulable image carrier to generate a line of image-bearing radiation, the radiation source comprising:
    (i) a plurality of light sources in a linear array;
    (ii) an optical integrator integrating light from the plurality of light sources directly into a uniformized linear illumination of substantially uniform irradiance;
    (iii) an aperture, disposed intermediate the plurality of light sources and optical integrator, for blocking unwanted light and directing light from the light sources in the linear array into the optical integrator; and
    (iv) at least one lens, positioned subsequent to the aperture, for imaging the uniformized linear illumination onto the surface;
    a sensing head for obtaining image data from the line of image-bearing radiation excited from the image carrier, the sensing head comprising a plurality of channels, each channel adapted to sense a segment of the line of image-bearing radiation; and
    an image processor for accepting the image data obtained from sensing head channels and forming a line of image data according to the line of image-bearing radiation.

11. The reading apparatus of claim 10 wherein the sensing head comprises a charge-coupled device.

12. The reading apparatus of claim 10 wherein the radiation source further comprises a filter adapted to condition the uniformized linear illumination from the optical integrator.

13. A method for providing linear illumination, the method comprising the steps of:

provtiding a plurality of light sources in a linear array;

providing an optical integrator for integrating light from the plurality of light sources directly into a uniformized linear illumination of substantially uniform irradiance;

providing an elongated aperture, positioned intermediate the plurality of light sources and optical integrator, for blocking unwanted light and directing light from the plurality of light sources in the linear array into the optical integrator; and imaging the uniformized linear illumination onto a surface.

* * * * *